United States Patent [19]
Van Hekken

[11] Patent Number: 5,489,145
[45] Date of Patent: Feb. 6, 1996

[54] CHAIR CUSION AND UPHOLSTERY ASSEMBLY AND METHOD

[75] Inventor: Hendrik R. Van Hekken, Allentown, Pa.

[73] Assignee: Westinghouse Electric Corporation, Pittsburgh, Pa.

[21] Appl. No.: 182,811

[22] Filed: Jan. 13, 1994

[51] Int. Cl.$^6$ .................................................. A47C 31/02
[52] U.S. Cl. ................... 297/452.57; 297/452.59
[58] Field of Search .................. 297/452.57, 452.59, 297/452.61; 5/402–407

[56] References Cited

U.S. PATENT DOCUMENTS

| | | | |
|---|---|---|---|
| 3,273,877 | 9/1966 | Geller et al. | 297/452.57 X |
| 3,586,370 | 6/1971 | Barecki et al. | 297/452.59 X |
| 3,758,159 | 9/1973 | Morris | 297/452.59 X |
| 3,807,800 | 4/1974 | Morrison et al. | 297/452.57 X |
| 4,025,114 | 5/1977 | Cave | 297/452 |
| 4,065,181 | 12/1977 | Gunlock | 297/452 |
| 4,099,774 | 7/1978 | Sandham | 297/298 |
| 4,332,419 | 6/1982 | Vogel | 297/443 |
| 4,554,205 | 10/1985 | Molnar | 297/455 |
| 4,792,189 | 12/1988 | Shovar | 297/452 |
| 4,853,995 | 8/1989 | Bethell et al. | 5/481 |
| 4,880,276 | 11/1989 | Shovar | 297/452 |

FOREIGN PATENT DOCUMENTS

| | | | |
|---|---|---|---|
| 2016099 | 11/1971 | Germany | 297/452.57 |
| 3018017 | 11/1981 | Germany | 297/452.57 |
| 1098541 | 6/1984 | U.S.S.R. | 297/452.65 |

Primary Examiner—Peter R. Brown

[57] ABSTRACT

Disclosed is a chair cushion and upholstery assembly and method used in the construction of one and two piece office type chairs. A molded plastic cushion liner member having a marginal portion surrounding one or more open portions and adapted to fit within a chair cushion support member is foamed in situ within an inset molding apparatus to fill the open portions of the cushion liner member and bond the foam cushion material to the liner member. Upholstery material covers the foam cushion material with the marginal edges of the upholstery material bonded to a foam-free peripheral or border surface of the cushion liner member with an adhesive or glue.

10 Claims, 5 Drawing Sheets

CHAIR CUSION AND UPHOLSTERY ASSEMBLY AND METHOD

BACKGROUND OF THE INVENTION

This invention relates to a chair cushion and upholstery assembly and method. It relates particularly to the manufacture and assembly of one and two piece office type chairs having padded and upholstered chair seats and chair backs. A one piece office chair has the padded and upholstered chair seat and the padded and upholstered chair back combined as a single integral unit, and usually enclosed in a molded plastic one piece outer shell. A two piece office chair has the upholstered and padded chair seat and a separate, but connected, padded and upholstered chair back which are usually enclosed in two separate molded plastic support shells.

In the past, office chairs have been manufactured and assembled primarily by hand. The installation of the padding and upholstery material for the chair seat and the chair back was highly labor intensive and required considerable time and skill on the part of the workers to produce chairs of high quality. Some upholstery materials, such as leather or plastics, often required a very highly skilled worker and considerable installation time. The time and skill required in the past to produce a quality and aesthetically pleasing chair added considerably to the cost of the chair to the consumer.

SUMMARY OF THE INVENTION

It is therefore an object of this invention to provide a chair cushion and upholstery assembly and method that greatly simplifies the installation of padding and liner and upholstery on chair seats and chair backs.

It is a further object of this invention to provide a chair cushion and upholstery assembly and method for the installation of padding and upholstery on chair seats and chair backs that can be adapted to many different designs of one and two piece office type chairs.

It is a still further object of this invention to provide a chair cushion and upholstery assembly and method for the installation of padding and upholstery on chair seats and chair backs that can be used with high speed production lines and with a minimum amount of hand labor.

It is still another object of this invention to provide a chair cushion and upholstery assembly and method for the installation of padding and liner and upholstery on chair seats and chair backs that greatly reduces the cost of producing the chair.

It has been discovered that the foregoing objects can be attained by the use of a composite molded cushion and upholstery assembly for installation in a chair cushion support member, comprising a molded plastic cushion liner member adapted to fit within the chair cushion support member and having a marginal portion surrounding one or more open portions. A foam cushion material is foamed in situ within an insert molding apparatus to fill the open portions of the cushion liner member and bond the foam cushion material to the liner member. Upholstery material covers the foam cushion material with the marginal edges of the upholstery material bonded to a foam-free peripheral surface of the cushion liner member.

DESCRIPTION OF THE PREFERRED EMBODIMENTS

Figure 1:
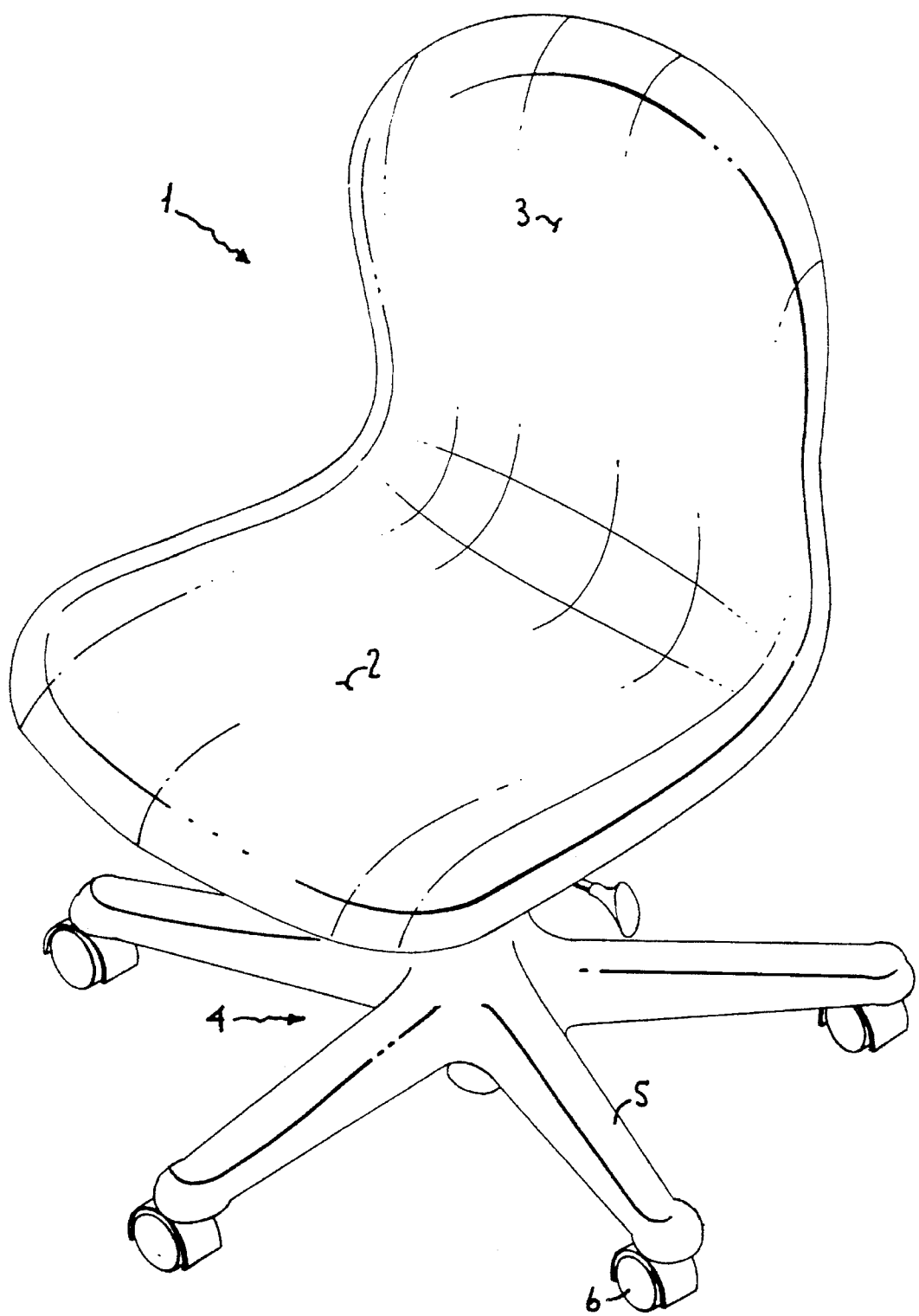
FIG. 1 is an isometric view of a typical one piece office chair manufactured in accordance with the chair cushion and upholstery assembly and method of this invention.

FIG. 1 illustrates an isometric view of a typical one piece office chair manufactured using the composite molded cushion and upholstery assembly and method of this invention. The typical one piece office chair 1 has a padded and upholstered chair seat portion 2 and a padded and upholstered chair back portion 3 combined as a single integral unit enclosed in a one piece molded plastic outer shell (not shown) that fits under the chair seat portion 2 and behind the chair back portion 3 to support the chair seat and chair back cushion assembly. The chair 1 is supported on a pedestal base 4 having radial legs 5 fitted with casters 6.

Figure 2:
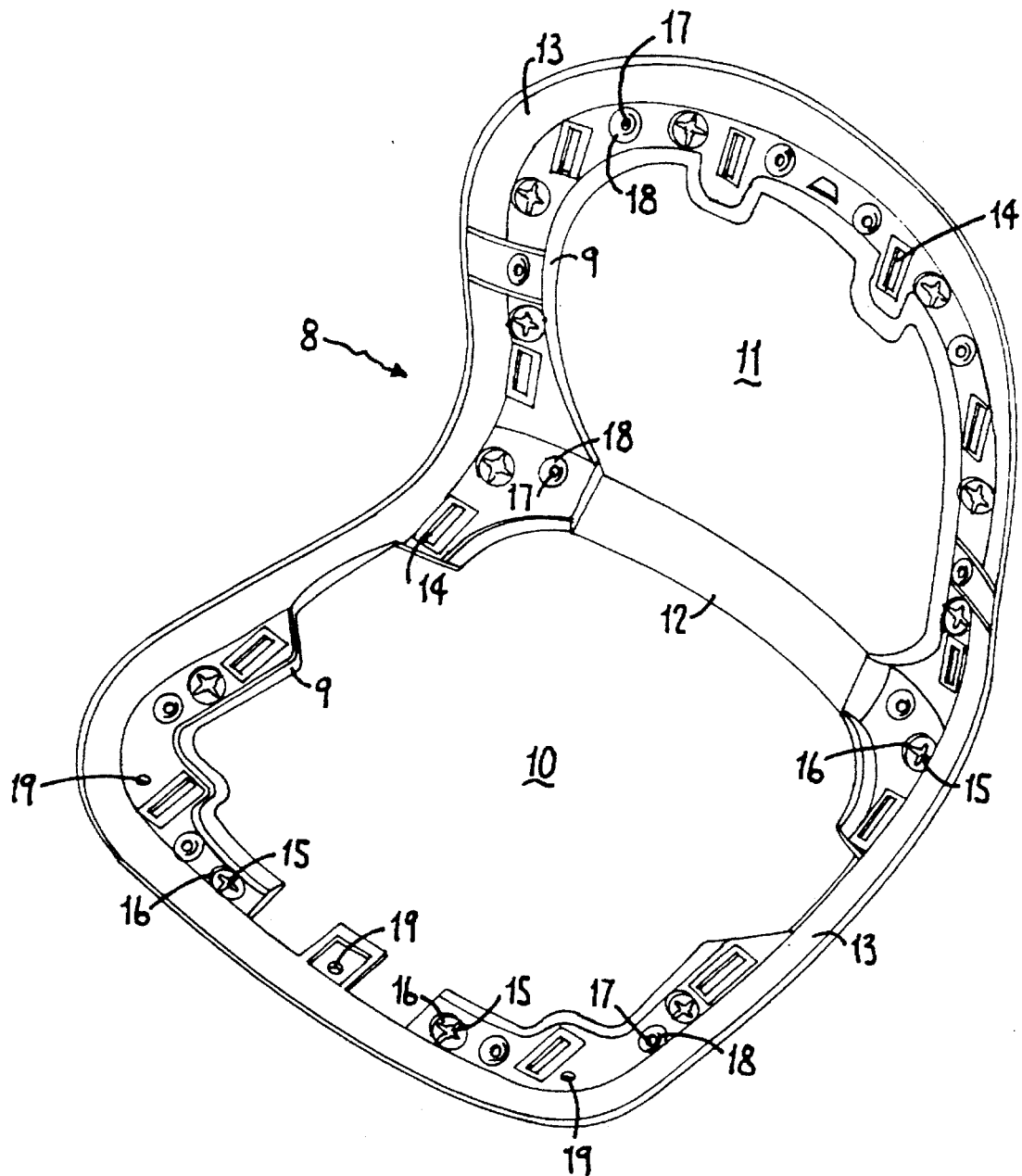
FIG. 2 is an isometric view of a preferred embodiment of the plastic cushion liner member used in the construction of the one piece office chair shown in FIG. 1.
Figure 3:
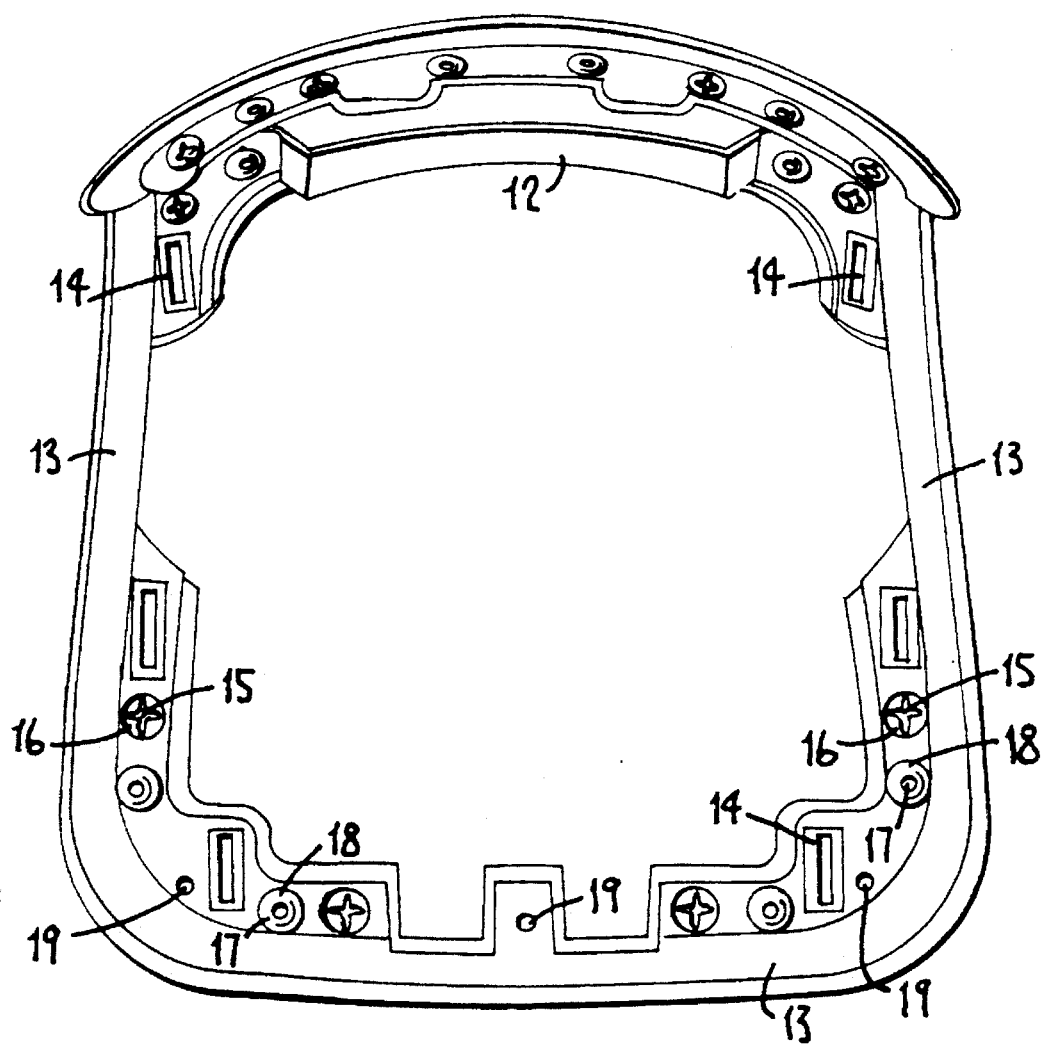
FIG. 3 is a top view of a preferred embodiment of the plastic cushion liner member used in the construction of the one piece office chair shown in FIG. 1.
Figure 4:
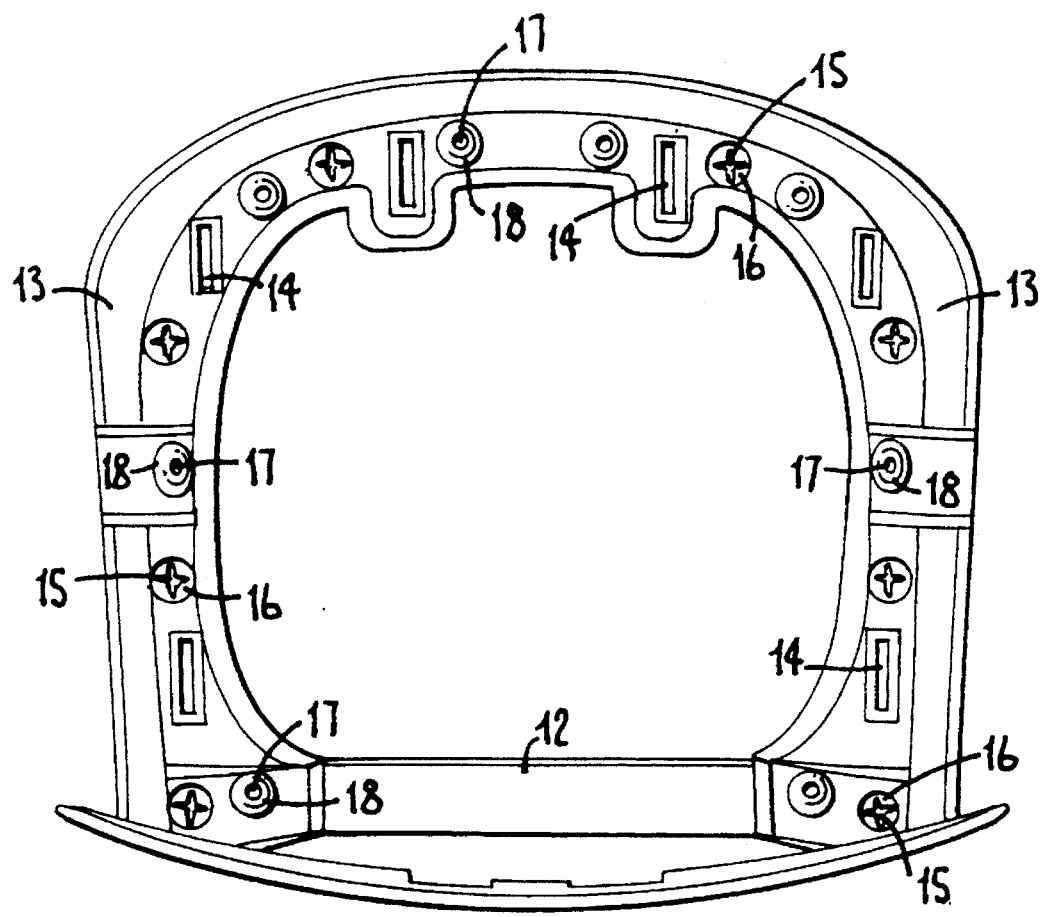
FIG. 4 is a front view of a preferred embodiment of the plastic cushion liner member used in the construction of the one piece office chair shown in FIG. 1.

FIGS. 2–4 illustrate an isometric front view, a top view and a front view, respectively of a unique molded plastic cushion liner member 8 used in the composite molded cushion and upholstery assembly adapted to fit within the molded plastic outer shell. The plastic cushion liner member 8 is injection molded of a thin but strong thermoplastic, preferably a acrylonitrile-butadiene-styrene (ABS) plastic, into a shape and dimensions capable of fitting within the molded plastic outer shell of the chair 1. The plastic cushion liner member 8, as illustrated in FIGS. 2–4, has a marginal portion 9 surrounding two large open central portions 10 and 11 separated by a divider portion 12. Extending around the periphery of the marginal portion 9 is a narrow border portion 13 whose front and rear surfaces are substantially smooth and planar, the rear surface of which is designed to remain free of foamed plastic cushion material.

As shown in FIGS. 2–4, the marginal portion 9 of the plastic cushion liner member 8 is provided with a plurality of molded openings, recesses and dimples used in the fabrication of the composite molded cushion and upholstery assembly of this invention. A series of substantially vertical narrow rectangular slots 14 are spaced at intervals around the marginal portion 9 which are adapted to receive and be attached to mating projections (not shown) formed on the inner surface of the plastic chair cushion support member shell with clips or suitable fasteners to attach the finished composite molded cushion and upholstery assembly of this invention to the plastic chair cushion support member shell. A series of substantially star shaped openings 15 set in a shallow circular recess 16 allow the plastic cushion liner member 8 to be positioned, supported and temporarily attached to pins within the mold cavity of an insert molding apparatus used for applying foam cushioning material to the liner member 8.

The marginal portion 9 is also provided with a plurality of spaced circular or elongate openings 17 in a raised dome 18 which allow a portion of the foam cushion material when foamed in the insert molding apparatus, to extrude through the openings 17 and become keyed thereto when the foam material solidifies.

In this embodiment, additional openings 19 were provided for attaching the front of the composite molded cushion and upholstery assembly to the front of the chair cushion support member shell with suitable fasteners, such as rivets.

While we have described the construction of the plastic cushion liner 8 for a single piece office type chair, as illustrated in FIG. 1, one skilled in the chair manufacturing art could easily make similar, but smaller plastic cushion liners for use in a two piece office type chair or chairs of a different design.

This invention has also resulted in a new and unique method for the installation of the cushion padding and upholstery material for a chair seat based on the use of the molded plastic cushion liner member 8, described above. This new and unique method utilizes the relatively large open portions 10 and 11 and the peripheral border portion 13 of the liner member 8 to provide a quality chair that can be produced quickly and efficiently with little hand labor or skill.

In the installation method of this invention, the liner member 8 is placed and supported within a mold cavity of a conventional insert molding apparatus. A suitable quantity of foamable plastic material is then introduced into the mold cavity using well known conventional foaming practices and technology. In this embodiment, a polyurethane foam was used and preferred for reasons discussed below. The bulk of the foam filled the open portions 10 and 11 to provide the chair seat and chair back cushions, while lesser amounts of the foam covered the rest of the front face of the liner member 8 to provide padding to the desired contour for both comfort to the user and aesthetics. A small amount of the foam is extruded by the pressure of the foaming operation through the circular or elongated openings 17 which mechanically keys or bonds the foam padding to the liner member 8. The rear surface of the narrow border portion 13 will remain free of the foam cushion material.

It has also been discovered that the molecules of certain plastics will chemically bond to each other. In this embodiment the molecules of the urethane foam was found to chemically bond to molecules of the ABS plastic of the liner member 8 and when solidified this bond could not be easily broken.

Figure 5:
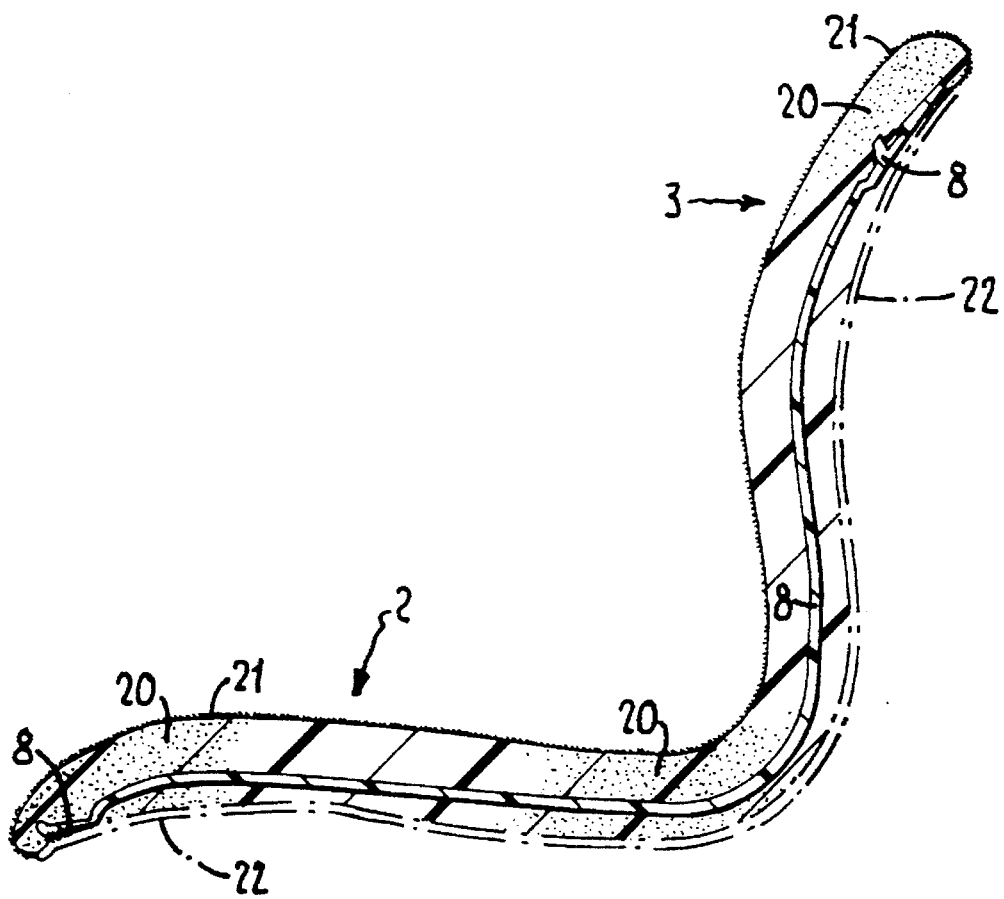
FIG. 5 is a typical sectional view of the composite molded cushion and upholstery assembly of this invention illustrating the plastic cushion liner, the foam cushion material, the upholstery material and, in phantom, the chair cushion support member used in the composite assembly for the one piece office chair shown in FIG. 1.

FIG. 5 illustrates a typical cross sectional view of the finished composite molded cushion and upholstery assembly of this invention which shows the plastic cushion liner 8, the foam cushion material 20, the outer upholstery material 21 and, in phantom, the plastic molded cushion support member or shell 22.

As best illustrated in FIG. 5, the rear surface of the border portion 13 which extends all around the periphery of the plastic cushion liner member 8, is a smooth planar surface which in the foaming process, is kept free of foam by a shield or shut-off material and provides a peripheral surface for the attachment of the marginal edges of the upholstery material 21, preferably with an adhesive or glue. This arrangement is suitable for placing the upholstery material on the assembly in a suitable press instead of the prior practice of using hand labor to stretch the upholstery over a separate foam cushion and then attaching the two to a wooden frame or support member with staples.

The plastic liner member 8 being made of a thin lightweight plastic allows for the foam cushion material to be cured in a conventional manner. In some prior chair designs that just foamed the inside surface of the heavy plastic cushion support member shell 22 and bonded the foam directly to the shell, the curing of the foam material required special curing processing, at extra cost, to prevent the formation of depressions or voids in the uncured foam caused by the heavy shell.

The actual shape, size and spacing of the openings in the plastic cushion liner member 8 of this invention will vary according to the design of the chair, but such variations are still within the scope of this invention. It is to be understood that the embodiment that has been described and illustrated is provided for describing this invention and not for purposes of limitation.

I claim:

1. A composite molded cushion and upholstery assembly for installation in a chair cushion support member, comprising a molded plastic cushion liner member adapted to fit within the chair cushion support member and having a marginal portion including an opening substantially surrounded by the marginal portion, a foam cushion material filling the opening of the plastic cushion liner member and bonded to its marginal portion, said marginal portion including a peripheral outer edge portion that is free of foam, and upholstery material covering the foam cushion material with marginal edge of the upholstery material bonded to said foam free outer edge portion of the cushion liner member.

2. The composite molded cushion and upholstery assembly of claim 1 in which the foam cushion material is foamed in place against the plastic cushion liner member.

3. The composite molded cushion and upholstery assembly of claim 1 in which the foam cushion material is mechanically bonded to the plastic cushion liner member by foam cushion material extruded through a plurality of holes extending through the marginal portion of the plastic cushion liner member.

4. The composite molded cushion and upholstery assembly of claim 1 in which the foam cushion material is chemically bonded to the plastic cushion liner member.

5. The composite molded cushion and upholstery assembly of claim 1 in which the foam cushion material is a polyurethane foam and the plastic cushion liner is made of an ABS thermoplastic.

6. The composite molded cushion and upholstery assembly of claim 1 in which marginal edges of the upholstery material are glued to a foam-free peripheral surface of the plastic cushion liner member.

7. The composite molded cushion and upholstery assembly of claim 1 has a first opening to receive foam cushion material for a chair seat and a second opening to receive foam material for a chair back.

8. The composite molded cushion and upholstery assembly of claim 1 wherein the width of the opening is substantially larger than the width of the marginal portion.

9. An injection molded plastic liner for use in a composite foam chair cushion comprising a marginal portion including a plurality of holes extending through the marginal portion, an opening surrounded by the marginal portion, a border portion formed on a peripheral outer edge of said marginal portion, the holes and the opening adapted to receive and retain a foamed in situ foam cushion material, and upholstery material covering the foam cushion material with the marginal edge of the upholstery material bonded to the border portion which remains free of foam cushion material.

10. The molded plastic liner of claim 9 in which the plastic is a thermoplastic ABS material.

* * * * *